April 22, 1952     B. B. ELLIS ET AL     2,594,002
THREE-PHASE CORE
Filed July 9, 1949     2 SHEETS—SHEET 1
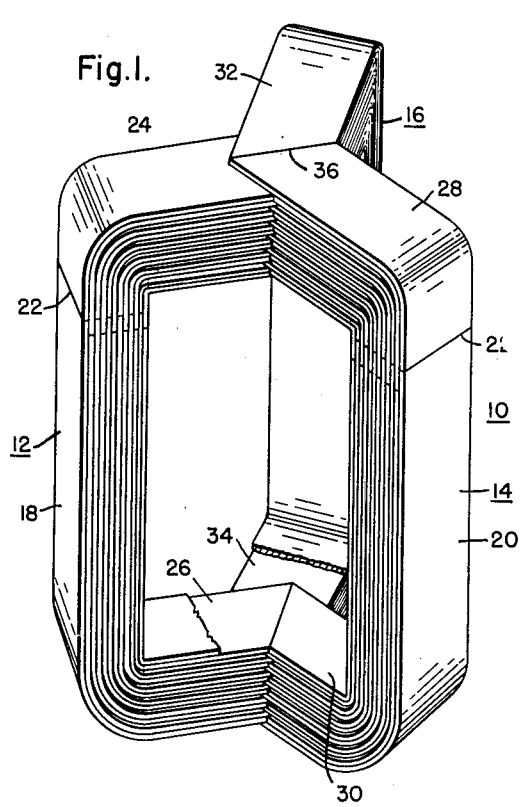
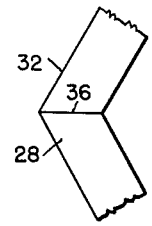
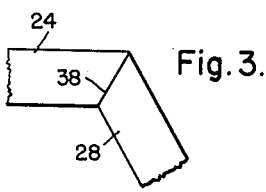
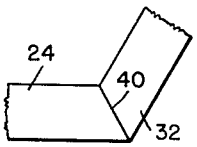
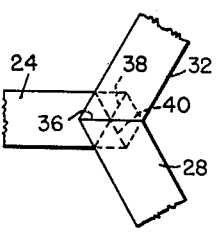
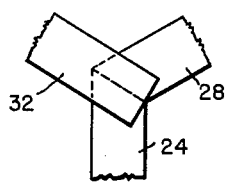
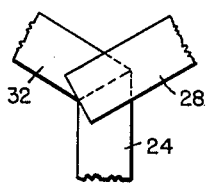
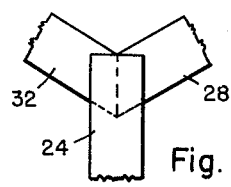
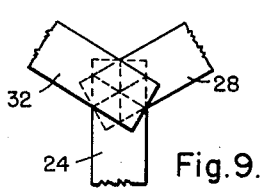
WITNESSES:
Edward Michaels
Thos. C. Groome
INVENTORS
Belvin B. Ellis, Clifford C. Horstman
& Charles E. Burkhardt.
BY
James N. Ely
ATTORNEY April 22, 1952
B. B. ELLIS ET AL
2,594,002
THREE-PHASE CORE
Filed July 9, 1949
2 SHEETS—SHEET 2
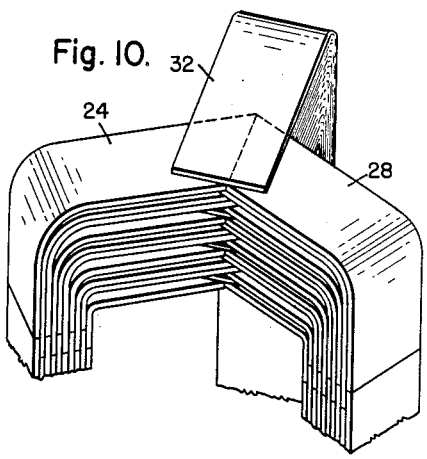
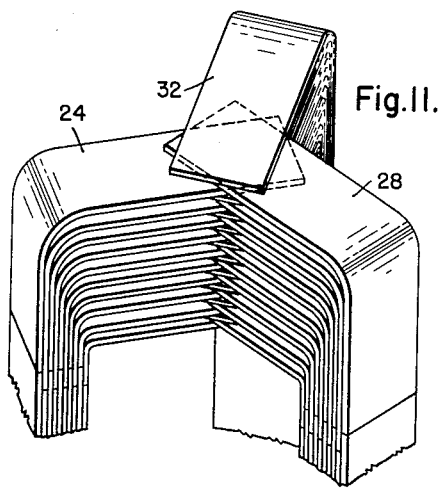
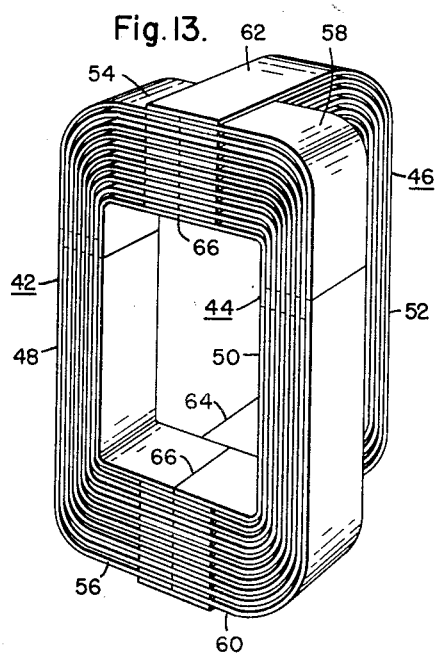
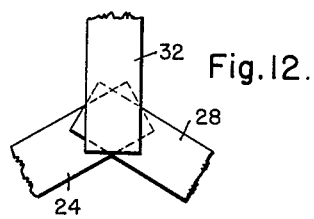
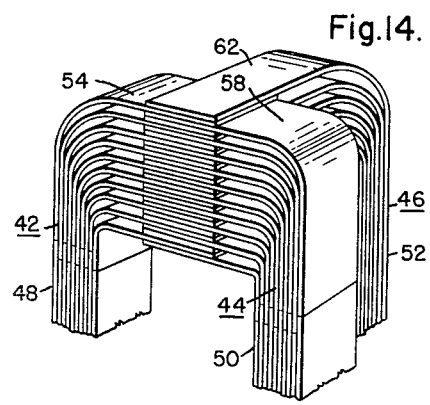
WITNESSES:
Edward Michaels
Wm. C. Groomes
INVENTORS
Belvin B. Ellis, Clifford C. Horstman,
& Charles E. Burkhardt.
BY
James N. Ely
ATTORNEY Patented Apr. 22, 1952

2,594,002

UNITED STATES PATENT OFFICE 2,594,002

THREE-PHASE CORE

Belvin B. Ellis, Sharon, and Clifford C. Horstman and Charles E. Burkhardt, Sharpsville, Pa., assignors to Westinghouse Electric Corporation, East Pittsburgh, Pa., a corporation of Pennsylvania Application July 9, 1949, Serial No. 103,864

1 Claim. (Cl. 175—356)

This invention relates to magnetic cores, and in particular to improvements in three-phase magnetic cores for stationary induction apparatus.

This application is a continuation-in-part of our application Serial No. 62,162, filed November 26, 1948, entitled Three-Phase Core, now Patent No. 2,579,578.

It has heretofore been the practice to form magnetic cores of layers of sheet steel having preferred orientation or the most favorable magnetic characteristics in the direction in which the magnetic flux passes through the strips or sheets of steel in attempting to produce cores having high permeability and low watts loss. Generally, the strips or sheets of steel are so cut and assembled that the direction of magnetization of the strip coincides substantially with the grain or direction of rolling of the steel having the preferred orientation, so that the lines of magnetic flux will not pass through the steel at an appreciable angle from the direction of rolling.

In our application, Serial No. 62,162, we have disclosed a number of three-phase core structures and efficient yoke-joint structures which enable the production of core structures having smaller dimensions, shorter length of magnetic circuit path, together with less iron loss in the core and a lower exciting current than the conventional three-phase core structures employed in the prior art.

In producing the core structure, it is, of course, desirable to employ the most efficient yoke-joint structure to produce a low poise level and maintain the magnetic losses at a value closely approximating that of the steel sheet material.

An object of this invention is to provide a three-phase core structure having a yoke-joint section thicker than one of the leg sections of the core to effect a lowering of the induction in the yoke-joint section and thereby lower the magnetic losses of the core structure.

Another object of this invention is to increase the amount of magnetic material in the yoke-joint section of a three-phase core structure to effect a reduction in the magnetic losses of the core section.

A further object of this invention is the provision of a three-phase core structure formed of three bundles of flatwise bent and nested laminations, the ends of which terminate in common yoke areas with at least one of the laminations of each layer of the end portion laminations of the three bundles terminating in a different plane and in overlapping relation with the other end portion laminations to increase the amount of core material in the yoke area to effect a reduction in the magnetic losses of the core structure.

Other objects of this invention will become apparent from the following description, when taken in conjunction with the accompanying drawings, in which:

Figure 1 is a view in perspective, with parts broken away, of a three-phase Y-core structure embodying the teachings of this invention;

Figs. 2, 3 and 4 are plan views illustrating the successive assemblies of the laminations of the end portions of the three bundles of laminations in the yoke section of the core structure of Fig. 1;

Fig. 5 is a top plan view of the yoke area formed by stacking the end-portion laminations of Figs. 2, 3 and 4;

Figs. 6, 7 and 8 are plan views of another embodiment illustrating three successive assemblies of the layers of laminations of the end portions of the bundles in the yoke area;

Fig. 9 is a top plan view of the yoke area formed by successive stacking of the laminations of Figs. 6, 7 and 8;

Fig. 10 is a view in perspective of a part of the core structure embodying the interleaved joint structure of Figs. 6, 7, 8 and 9;

Fig. 11 is a view in perspective of a part of a three-phase core structure illustrating the interleaved yoke-joint structure of another embodiment of this invention;

Fig. 12 is a top plan view of the yoke area of the structure shown in Fig. 11;

Fig. 13 is a view in perspective of a three-phase T-core structure illustrating another embodiment of this invention; and Fig. 14 is a view in perspective of a part of a three-phase T-core structure illustrating an interleaved yoke structure embodying the teachings of this invention.

Referring to the drawings, Figure 1 illustrates a core structure 10 formed of three stacks of bundles 12, 14 and 16 of laminations of magnetic steel having a preferred orientation and which are bent flatwise of the laminations and nested, the bundles 12, 14 and 16 having three parallel leg portions 18, 20 and 22, respectively, for receiving windings (not shown) and upper and lower inwardly turned end portions 24—26, 28—30 and 32—34, respectively, which terminate in a predetermined relation in yoke areas common to the three bundles. In this embodiment, the three leg portions 18, 20 and 22 are spaced symmetrically about a common center or axis so that the windings (not shown) will be positioned symmetrically when assembled thereon.

Each of the bundles 12, 14 and 16 is similarly formed of laminations of magnetic material such as cold-rolled silicon-iron alloy strip material, the laminations being nested and formed into the bundles with suitable leg joints 22 of the stepped, overlap type to permit the separation of the upper core section and the lower core section for the purpose of assembling the coils (not shown) about the winding legs 18, 20 and 22 after which the core sections are united to form the complete core structure.

In accordance with this invention, the laminations of the end portions 24, 26, 28, 30, 32 and 34 are assembled in a predetermined manner to increase the amount of magnetic strip material in the yoke areas common to the three bundles. In the embodiment illustrated in Figs. 1 through 5, it is seen that two of the end portions of each layer of laminations are formed in butting relation and in the same plane, whereas the third end portion of the layer of laminations is disposed in a different plane and in overlapping relation with the joint structure of the first two end-portion laminations while being in butting relation with one of the end-portion laminations of the adjacent layer of laminations. Thus, in Fig. 2, the end portions 28 and 32 of the external layer of laminations are formed with edge portions 36 cut at an angle of 60° to longest side of the lamination in the direction of the laminations so that when the end portions are assembled in a butt-joint relation along the cut edge, the end portions extend outwardly from the joint area, or butting edge portions 36, 120° apart. Fig. 3 illustrates a corresponding joint formed between the end portion 24 of the external lamination of bundle 12 with an end portion 28 of the next adjacent layer of laminations, whereas Fig. 4 illustrates the corresponding butt joint formed between the end portions 24 and 32 of the next adjacent layer of laminations of the bundles 12 and 14, respectively.

In each of Figs. 2, 3 and 4, the two end portions forming the butt joints illustrated are progressively turned 120° apart so that when stacked progressively one upon another, the yoke-joint structure illustrated in Figs. 5 and 1 is obtained. In such structure, the butt joint 36 formed between the two butting laminations of end portions 28 and 32 which are in the same plane is overlapped by the butting laminations of end portions 24 and 28 in the plane adjacent thereto, the joint line 38 thereof crossing the joint line 36 at the midpoint thereof, as shown in Fig. 5, whereas the joint line 40 of the butting laminations of end portions 24 and 32 of the next layer as shown in Fig. 4, is displaced relative to the joint lines 36 and 38. By stacking the laminations of the end portions in this manner, a Y-core member having a common yoke area is obtained which has a height substantially equivalent to one and a half times the thickness of the winding leg portion of one of the individual bundles.

In another embodiment of this invention, a Y-core is formed as illustrated in Figs. 6 through 10. In this embodiment, the external lamination of the end portion 32 terminates in a plane distinct from the plane of the external laminations of the end portions 24 and 28 which are disposed in the same plane in butt-joint relation as described with respect to Fig. 4, the external laminations extending at angles of 120° apart from the common yoke area as illustrated in Fig. 6. The second layer of laminations of the end portions 24, 28 and 32 is similarly assembled but in such case, the laminations of end portions 32 and 24 are disposed in the same plane in butting relation with the lamination of end portion 28 in a different plane overlapping the butt joint of the laminations of end portions 32 and 24 as illustrated in Fig. 7.

The second layer lamination of end portion 28 thus separates and overlaps the butt joints of the external laminations and second layer laminations, which butt joints are disposed at an angle of 120° apart. Likewise, the third layer of laminations of the end portions 24, 28 and 32 are assembled as shown in Fig. 8 with the laminations of end portions 32 and 28 in the same plane with a butt joint therebetween and the lamination of end portion 24 terminating in a different plane and overlapping the butt joint of the laminations of end portions 32 and 28.

With the yoke area progressively constructed in this manner, as illustrated in Figs. 9 and 10, the butt joint formed between two of the laminations of each layer is overlapped by the third lamination of each layer and by progressively stacking the layers of end portions 24, 28 and 32 in the manner shown in Figs. 6, 7 and 8 and repeating the stacking in such order, a common yoke area is obtained having a thickness substantially equivalent to two times the thickness of any one of the winding legs of the bundles.

Another embodiment of this invention, as applied to a Y-core structure, is illustrated in Figs. 11 and 12 of the drawing. In this embodiment, the ends of the laminations of the end portions 24, 28 and 32 are progressively interleaved with each other in overlapping relation, each lamination being in a separate plane in the yoke area whereby the yoke area has a height or thickness that is substantially equivalent to three times the thickness of one of the winding legs of the bundles. The yoke area of this embodiment is thus free of butt joints, the overlap of the laminations giving an efficient joint structure.

Fig. 13 is an illustration of the embodiment of this invention in a T-core structure. In this embodiment, three bundles 42, 44 and 46 are similarly formed by flatwise bending laminations of suitable length to form winding legs 48, 50 and 52, respectively, the bundles having end portions 54—56, 58—60 and 62—64, respectively. Two of the bundles 42 and 44 are disposed with the end portions thereof facing each other and with the laminations of end portions 54 and 56 terminating in the same plane as corresponding laminations of the end portions 58 and 60, respectively, and in square butt-joint relation therewith, as shown at 66. The third bundle 46 of laminations is disposed with its end portions 62 and 64 disposed at substantially right angles to the butting end portions of bundles 42 and 44 with the laminations of the end portions 62 and 64 interleaved with the butting laminations of end portions 54—58 and 56—60, respectively, to overlap the butt joints 66 of such laminations. Such construction provides a good joint structure and gives a common yoke area having a height substantially equivalent to two times the thickness of one of the winding legs of the three bundles forming the T-core.

Where it is desired to further increase the amount of magnetic material in the common yoke areas of a T-core structure, the core may be formed as illustrated in Fig. 14 of the drawings. In this embodiment of the invention, the bundles 42 and 44 are also disposed with their end portions facing each other but the laminations thereof are disposed in overlapping relation with each other and with the laminations of the end portions of the bundle 46 which is disposed perpendicular to the two facing bundles 42 and 44. The overlap of the laminations of the end portions of the bundles is preferably equivalent to the width of the laminations of the end portion 62 whereby a symmetrical yoke area is obtained. The resulting structure has a common yoke area having a height substantially equivalent to three times the thickness of the winding leg of one of the bundles of magnetic material.

This invention makes possible the construction of Y and T-core structures which have excellent sound-level characteristics together with low magnetic losses. The extra magnetic material in the common yoke areas obtained by assembling the end portions of the bundles as described hereinbefore allows the flux produced in the core structure in use as a transformer core to flow or pass through the critical three-way joints formed in the yoke areas at a lower flux density thereby keeping the iron loss of the core at a value more nearly that value found in testing Epstein samples of the magnetic material. It is thought that increasing the amount of magnetic material in the yoke area effectively lowers the induction at the joint correspondingly and the losses are decreased in accordance with the lowered induction.

In addition to effectively lowering the iron loss of the cores, the structures of this invention permit a greater tolerance in the building of the yoke area as the construction of lap joints, which are used in every embodiment of the invention, are not as critical as butt joints.

While reference has been made herein to laminations and to layers of laminations of magnetic strip material, it will be appreciated that such laminations may consist of a single strip or of a small number of strips taken as a unit. The laminations shown in the drawings therefore represent either single strips or a number of strips, for example, three or five, taken as a unit. The laminations shown in the drawings are shown relatively thicker than would normally be used in practice, but such showing is intentional for more clearly illustrating this invention.

We claim as our invention:

A three phase magnetic core comprising, three generally U-shaped bundles of layers of laminations of magnetic strip material having a preferred grain orientation bent flatwise of the laminations to form a winding leg and turned end portions for each of the bundles, corresponding end portions of the corresponding layers of laminations of the three bundles terminating in jointed relation with each other in common yoke areas, each of the common yoke areas having the laminations terminating therein in a predetermined joint pattern, the joint pattern consisting of, two of the corresponding layers of two of the corresponding end portions of two of the bundles extending at an angle of 120° to each other and terminating in a butt joint with each other in a given plane, said two of the corresponding layers having butting edges formed thereon at an angle of 60° to the direction of the laminations, the corresponding layer of the corresponding end portion of the third bundle cooperating with another of the layers of one of said two bundles to extend at an angle of 120° thereto and terminating in a butt joint therewith in a plane different from said given plane, the other layers of the bundles corresponding to said another layer of said one bundle also extending at an angle of 120° to each other and terminating in a butt joint in a plane different from said other planes, the joint pattern being progressively repeated throughout the yoke area to give the yoke area a height substantially equivalent to one and a half times the thickness of the winding leg of any one of the individual bundles, the corresponding end portions of the bundles extending outwardly from the common yoke areas at angles of 120° apart.

BELVIN B. ELLIS.
CLIFFORD C. HORSTMAN.
CHARLES E. BURKHARDT.

REFERENCES CITED

The following references are of record in the file of this patent:

UNITED STATES PATENTS

| Number | Name | Date |
| --- | --- | --- |
| 400,862 | Lowrie | Apr. 2, 1889 |
| 523,572 | Hassler | July 24, 1894 |
| 2,300,964 | Putnam | Nov. 3, 1942 |
| 2,367,927 | Chubb | Jan. 23, 1945 |
| 2,456,461 | Dunn | Dec. 14, 1948 |
| 2,477,350 | Somerville | July 26, 1949 |
| 2,489,625 | Dornbush | Nov. 29, 1949 |
| 2,516,164 | Vienneau | July 25, 1950 |